(12) United States Patent
Goddard

(10) Patent No.: US 7,392,028 B2
(45) Date of Patent: Jun. 24, 2008

(54) RADIO RECEIVER/TRANSCEIVER INCLUDING AN INTERFACE CIRCUIT SELECTIVELY OPERABLE IN A CURRENT MODE OR A VOLTAGE MODE

(75) Inventor: Simon Peter Goddard, Sheffield (GB)

(73) Assignee: Jennic Limited, Sheffield (GB)

( * ) Notice: Subject to any disclaimer, the term of this patent is extended or adjusted under 35 U.S.C. 154(b) by 365 days.

(21) Appl. No.: 10/926,469

(22) Filed: Aug. 26, 2004

(65) Prior Publication Data
US 2006/0046683 A1 Mar. 2, 2006

(51) Int. Cl.
*H04B 1/06* (2006.01)
(52) U.S. Cl. .................. 455/234.1; 455/323; 455/251.1; 375/345; 375/218; 330/254; 330/261
(58) Field of Classification Search .............. 455/251.1, 455/234.1, 232.1–253.2, 200.1, 230, 323, 455/343.1; 375/318, 317, 345; 330/253, 330/252, 254, 261
See application file for complete search history.

(56) References Cited

U.S. PATENT DOCUMENTS

| | | | | |
|---|---|---|---|---|
| 5,867,778 | A * | 2/1999 | Khoury et al. | 455/321 |
| 6,778,594 | B1 * | 8/2004 | Liu | 375/222 |
| 6,912,381 | B2 * | 6/2005 | Murtojarvi | 455/296 |
| 7,013,118 | B2 * | 3/2006 | Darabi et al. | 455/240.1 |
| 7,057,451 | B2 * | 6/2006 | Lou et al. | 327/553 |
| 2002/0086654 | A1 * | 7/2002 | Cowley et al. | 455/343 |
| 2003/0181179 | A1 * | 9/2003 | Darabi | 455/234.1 |
| 2004/0176055 | A1 * | 9/2004 | Vepsalainen et al. | 455/130 |

OTHER PUBLICATIONS

ZigBee Alliance "ZigBee Specification" ZigBee Document 053474r06, Version 1.0, 378 pages Dec. 14, 2004.
IEE Computer Society "Part 15.4: Wireless medium Access Control (MAC) and Physical Layer (PHY) Specifications for Low-Rate Wireless Personal Area Networks (LR-WPANs)" 802.15.4, *IEEE Standards for Information Technology* 679 pages Oct. 1, 2003.

* cited by examiner

*Primary Examiner*—Blane J. Jackson
(74) *Attorney, Agent, or Firm*—Myers Bigel Sibley & Sajovec, P.A.

(57) ABSTRACT

A radio receiver is selectively operable in a current mode or a voltage mode according to conditions prevailing within a wireless environment. If the signal levels within the wireless environment are relatively low, the radio receiver is operable in current mode. If the signal levels within the wireless environment are relatively high, the radio receiver is operable in voltage mode. The radio receiver is switchable between current and voltage mode of operation via selectively actuable switches that bringing into effect or remove from effect corresponding resistances.

16 Claims, 5 Drawing Sheets

300

RADIO RECEIVER/TRANSCEIVER INCLUDING AN INTERFACE CIRCUIT SELECTIVELY OPERABLE IN A CURRENT MODE OR A VOLTAGE MODE

FIELD OF THE INVENTION

The present invention relates to a radio receiver/transceiver.

BACKGROUND TO THE INVENTION

It will be appreciated by those skilled in the art that IEEE 802.15.4 is a simple packet data protocol for lightweight wireless networks, used in controllers, sensors, remote monitoring etc. where long battery life is important. This protocol is targeted at home and building automation and controls, PC peripherals, medical monitoring and toys. The primary motivations behind IEEE 802.15.4 are simplicity, long battery life, networking capabilities, reliability and cost. It will be appreciated that the Zigbee™ Alliance governs standards applicable to the above, further details of which are available at http://www.zigbee.org. One skilled in the art appreciates that the Zigbee Alliance has defined, or is in the process of defining, a standard that relates to the layers of a communication stack that are above the PHY and MAC layers of IEEE 802.15.4 standard.

Conventional transceivers compliant with this standard have operated exclusively in either a current mode or voltage mode. Operating the transceiver in a current mode is preferable in an environment where small signals prevail, that is, in an environment in which the signals have signals strengths for example from −95 dBm to −50 dBm. Operating the transceiver in a voltage mode is preferable in an environment where relatively larger signals prevail such as, for example, signals having a signal strength of −49 dBm to −10 dBm.

Therefore, it will be appreciated that a transceiver operable in current mode might be unsuitable for use in a wireless environment in which relatively large signals prevail. Similarly, a transceiver operable in voltage mode might be unsuitable for use in a wireless environment in which relatively small signals prevail.

It is an object of embodiments of the present invention to at least mitigate some of the problems of the prior art.

SUMMARY OF INVENTION

Accordingly, a first aspect of embodiments of the present invention provides a radio receiver comprising an interface circuit coupling the mixer to an active filter, wherein the receiver comprises means to set the mode of operation of the radio receiver to be operable in a current mode or a voltage mode.

Advantageously, when the radio receiver is used in, or detects, a Zigbee environment, or other radio environment, having low signal conditions, the mode of operation of that radio receiver can be switched to accommodate such low input signal conditions. Conversely, when the radio receiver is used in, or detects, a Zigbee environment, or other radio environment, having relatively larger signal conditions, the mode of operation of that radio receiver can be switched to accommodate such relatively large input signal conditions. In essence, the radio receiver is operable to switch between current and voltage modes of operation according to prevailing conditions.

It will be appreciated that embodiments of the invention relate to part of the receiver; namely the first mixer and channel filter. In preferred embodiments, the input frequency to the mixer is between 2.405 MHz and 2.48 MHz, which is down-converted to an IF of 3 MHz using a variable low side local oscillator. It will be appreciated that there could be many different combinations of input frequency and IF.

There are many different possible combinations of gains, which depend on things like supply voltage and the maximum swing that can be tolerated at the filter output etc.

Preferably, embodiments are provided in which the receiver has an acceptable dynamic range for the whole receiver from −95 to −20 dBm minimum.

In preferred embodiments, the filter is preferably an active filter. Alternative embodiments can be realised in which an amplifier is used instead of a filter. However, preferred embodiments use a filter to remove unwanted signals as early as possible in the receiver chain.

Preferably, embodiments provide a radio receiver further comprising means for varying the gain of the active filter according to whether the radio receiver is operable in a current mode or a voltage mode. In preferred embodiments, a relatively high gain is used in current mode. In current mode, the voltage gain of the mixer and first filter stage is 44 dB, the gain of the second stage of the filter is preferably between 12.0 dB and −6.0 dB. The gain can be set in the following discrete steps 12/6/0 and −6 dB. A preferred overall gain of the receiver is between 56.0 dB and 38.0 dB.

Embodiments can be realised in which the noise figure is between 5.6 and 6.2. This is preferable since it reduces the noise contribution of the following stages of a receiver.

Furthermore, the relatively low gain is used when the radio receiver is operable in the voltage mode. In voltage mode, the voltage gain of the mixer and first filter stage is either 24 dB or 8 dB and the second stage gain can be varied as for current mode. With the combination of current and voltage modes, the voltage gain can be varied to a number of values based on signal strength, while still at least influencing and, preferably, optimising, at least one of noise figure, linearity and current consumption. A better optimisation can be achieved than would be possible using only current or voltage mode.

In preferred embodiments, the mode of operation of the radio receiver is governed by the mode of operation of the mixer. In effect, the drive provided by the mixer into, or for, the active filter is either a current drive or a voltage drive.

In current mode, the impedance of the mixer load is relatively high and the filter input impedance is relatively low such that substantially all of the signal current generated in the mixer is transferred to the filter. The first stage of the filter then acts as a transresistance amplifier converting the input current to an output voltage.

In voltage mode, the impedance of the mixer load is made relatively low and the input impedance of the filter is relatively high such that the voltage at the output of the mixer is virtually un-attenuated by the filter loading. The first stage of the filter then acts as an inverting voltage amplifier.

Preferably, the active filter is an active polyphase filter. In preferred embodiments, the active polyphase filter is realised using fully differential operational amplifiers, that is, operational amplifiers having differential inputs and differential outputs.

Preferred embodiments provide a receiver comprising I and Q mixers and a polyphase filter to provide image rejection for signals 3 MHz below the LO frequency. It will be appreciated that this arrangement is advantageous because the IF is so low.

However, embodiments can be realised such that, in a superheat receiver where the IF is sufficiently high that a filter external to a chip embodying the receiver can filter the image frequency so the mixer could be followed by a conventional filter.

Embodiments are provided in which the active filter comprises a feedback resistance. In preferred embodiments the feedback resistance is variable. The gain of the radio receiver is influenced by both the transconductance of the mixer and the value of the feedback resistance, gm.Rf. When operating in a current mode, the value of Rf is set so it is relatively high.

An RF voltage at the input of the mixer's voltage to current converter is converted to a current by the transconductance of the input transistors this is then passed to the mixer switching transistors, which convert the current to the IF of 3 MHz. The mixer's V to I converter can be thought of as a transconductance stage with an effective transconductance, gm. The voltage gain is thus the product of this effective transconductance, gm, and the feedback resistor, Rf.

One skilled in the art might think that the value of the feedback resistor Rf should be reduced within a large signal environment. However, if the required attenuation is large, significantly reducing the value of the feedback resistor requires a correspondingly large output drive current to be supplied by the filter op-amps. It will be appreciated that any such large output drive current within a mobile context is clearly undesirable since it increases power consumption. Therefore, preferred embodiments of the present invention are arranged such that the means to set the radio receiver to be operable in a current mode or a voltage mode comprises means to limit current consumption during a voltage mode of operation. Preferably, the means to limit the current consumption comprises means to switch in and out a plurality of resistances. In preferred embodiments, a pair of input resistors, coupling the mixer to the active filter, can be selectively bypassed or made effective, that is, they can be selectively enabled and disabled. It will be appreciated that the overall gain over the active filter will then be influenced by the ratio of the feedback resistance to the series input resistance.

In current mode, the Rf resistors cannot be reduced too much because the output of the op-amps are loaded by the resistors. Therefore, when the voltage swing at the output of the op-amp is large, the current drive of the op-amps needs to be large.

Preferred embodiments further comprise a plurality of variable resistances within the active filter for influencing the overall frequency response of the active filter. It will be appreciated that appropriate selection of the resistances within the active filter will allow the filter to be controlled so that it operates in accordance with the requirements of IEEE 802.15.4. It will be appreciated that changing the feedback resistance changes the frequency response of the filter. Therefore, to maintain a desired frequency response means that other resistances in the active filter should preferably also need to be changed.

BRIEF DESCRIPTION OF THE DRAWINGS

Embodiments of the present invention will now be described, by way of example only, with reference to the accompanying drawings in which.

DETAILED DESCRIPTION OF THE PREFERRED EMBODIMENTS

Figure 1:
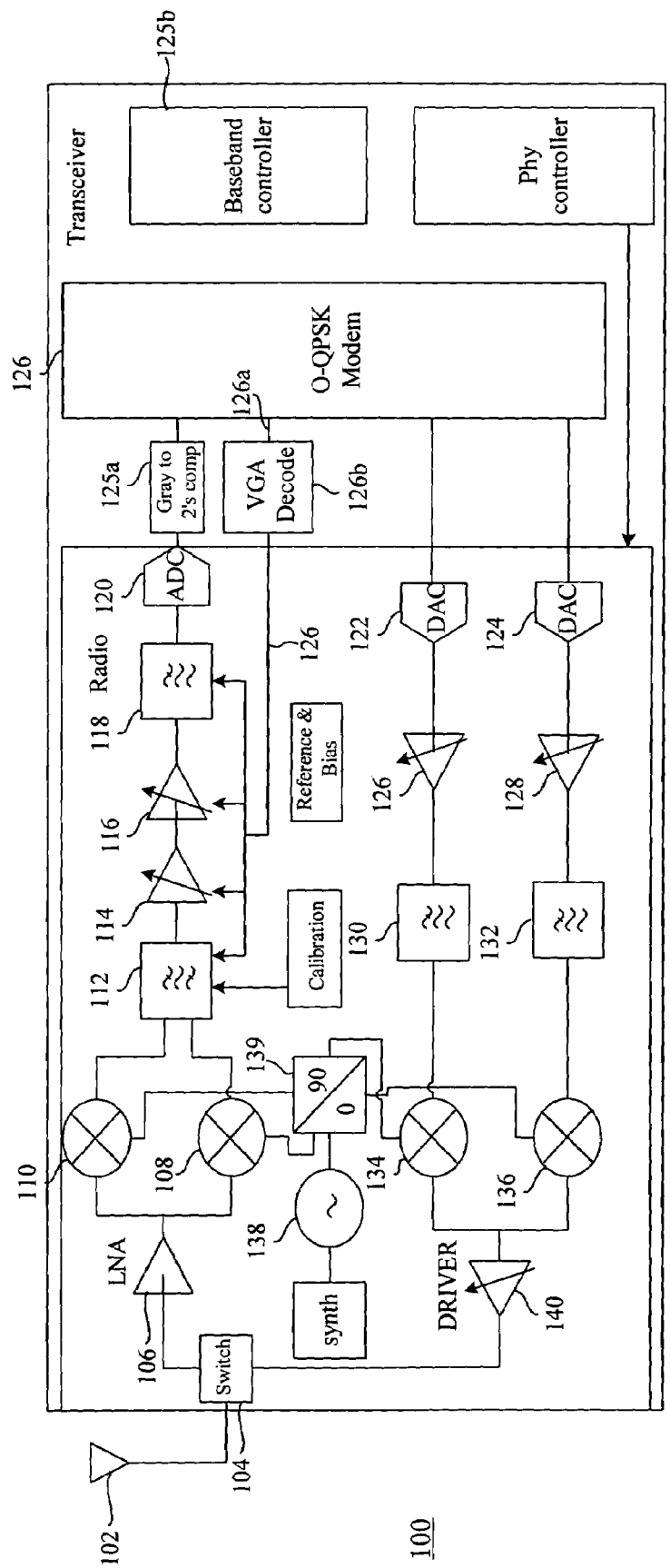
FIG. 1 illustrates the structure of a radio receiver/transceiver.

FIG. 1 shows a transceiver 100. The transceiver comprises an antenna 102 coupled to a switch 104. The switch 104 is arranged to direct a received signal to a low noise amplifier 106. The low noise amplifier 106, having amplified the received signal, feeds that received signal to a pair of I and Q channel mixers 108 and 110 to produce I and Q channel IF signals that are band pass filtered by a band pass filter 112. The filtered IF signals are amplified using a pair of variable gain amplifiers 114 and 116. The amplified signals are then filtered by a low pass filter 118 to produce a baseband signal that is digitised using an analogue to digital converter 120. The digital signal is converted from Gray coding to 2's complement format, via a converter 125a, and passed to an O-QPSK modem 126 for subsequent output to a baseband controller 125b. A control signal 126a is generated by the O-QPSK modem 126 and processed by a variable gain amplifier decoder 126b for converting the control signal to control signals 126c suitable for controlling the gain of the variable gain amplifiers 114 and 116 having determined a received signal strength from the output of the A/D converter 120.

It can be appreciated that the transmit part of the transceiver 100 comprises a pair of digital to analogue converters 122 and 124 for converting the digital outputs of the O-QPSK modem 126 to analogue signals. The outputs of the digital to analogue converters 122 and 124 are fed to respective variable gain amplifiers 126 and 128. The outputs of the variable gain amplifiers 126 and 128 are fed to respective low pass filters 130 and 132. The outputs of the low pass filters 130 and 132 are fed to a pair of mixers 134 and 136 so that the output of the filters 130 and 132 are mixed with a local oscillator signal and a 90° phase shifted version of that local oscillator signal, generated by a local oscillator 138 and a phase shifter 139, to form I and Q channels. The I and Q channels are combined via a variable gain driver 140 and fed to the switch 104 for subsequent transmission via the antenna 102.

Figure 2:
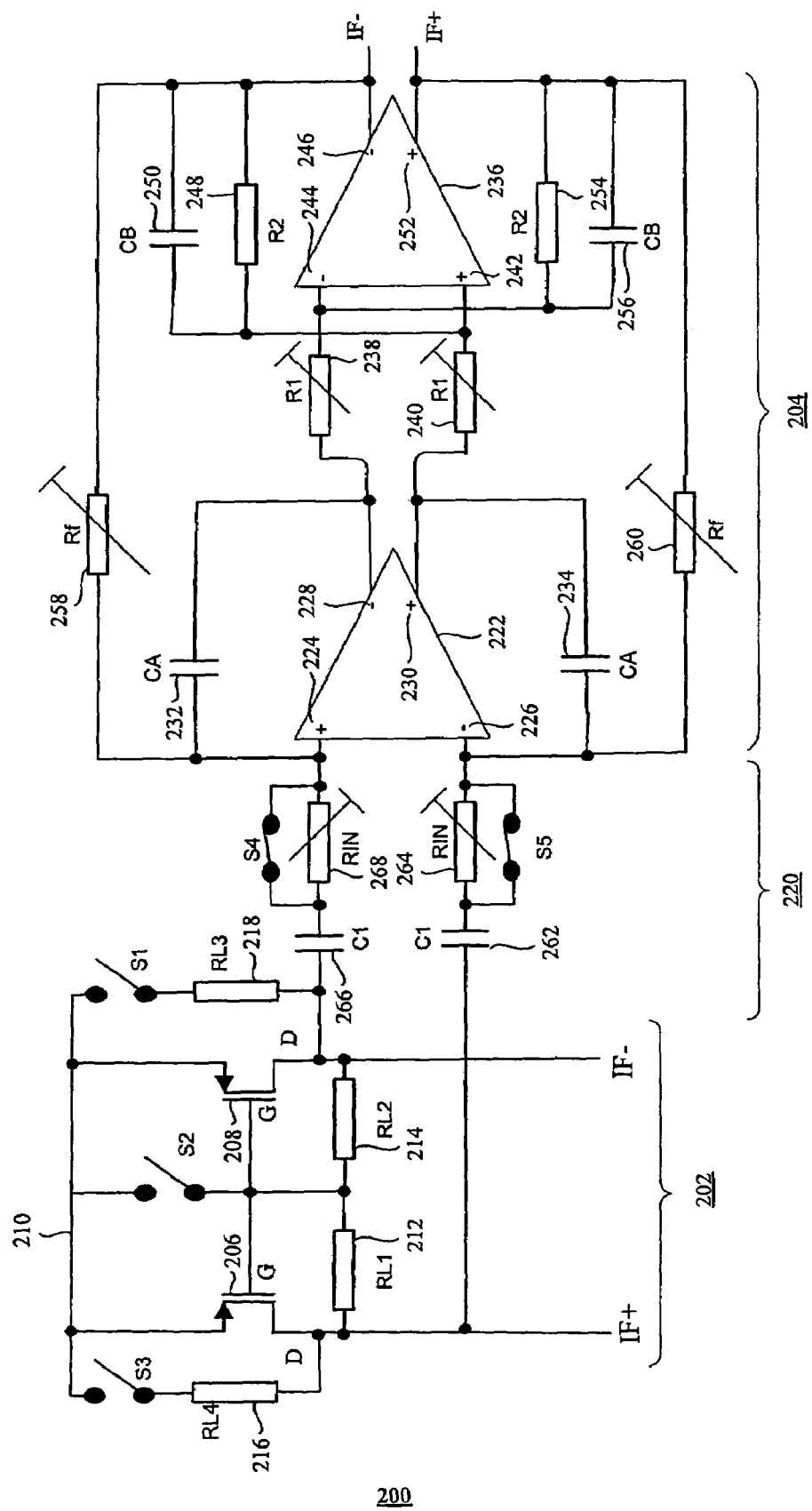
FIG. 2 shows part of the radio receiver, operable in current mode, according to a first embodiment.

Referring to FIG. 2, there is shown, at least part of, a radio receiver 200. Typically, the radio receiver 200 comprises a mixer (not shown) for producing differential output current signals IF+ and IF−. The mixer can a single balanced or a double balanced active mixer. In preferred embodiments, the mixer is a Gilbert cell. The radio receiver comprises an interface circuit 202. The interface circuit 202 is coupled to an active filter 204. In preferred embodiments, the active filter 204 is an active polyphase filter. The interface circuit 202 is arranged to act as an interface between the mixer and the filter 204, with the interface being operable in current mode or voltage mode according to prevailing signal conditions.

It can be appreciated that the interface circuit 202 comprises first 206 and second 208 p-type MOSFETs. These drains (D) of the MOSFETs 206 and 208 are arranged to receive a differential RF input signal, IF+, and IF− from the mixer. The gates (G) of the two MOSFETs 206 and 208 are coupled together and are selectively couplable to a power rail 210 via a switch, S2. The pmos transistors 206 and 208, together with a pair of resistors 212 and 214 form a high impedance load for the mixer in current mode so that substantially the entire signal current flows into the filter. In a preferred embodiment, the values of the resistors 212 and 214 are 200 kΩ. The resistors 212 and 214 provide biasing for the gates of the transistors 206 and 208. Although other values of resistance could be used for the two resistors 212 and 214, increasing them above 200 kΩ has little effect due to the shunt output resistance of the transistors 206 and 208. The midpoint of the two resistors is connected to the gates of the two MOSFETs 206 and 208. The drain of the first MOSFET 206 is coupled to the power rail 210 via a corresponding resistor 216 and a selectively actuable switch, S3. Similarly, the drain of the second MOSFETs 208 is coupled to the power rail 210 via a corresponding resistor 218 and a selectively actuable switch, S1.

The active polyphase filter 204 comprises a first fully differential operational amplifier 222 having differential inputs 224 and 226 and differential outputs 228 and 230. The negative differential output 228 is coupled to the positive differential input 224 via a feedback capacitor 232. The positive output 230 is coupled to the negative input 226 via a respective feedback capacitor 234.

The first opamp 222 is coupled to a second fully differential operational amplifier 236 via a pair of variable resistances 238 and 240. It can be appreciated that the negative differential output 228 of the first opamp 222 is coupled, via a respective variable resistance 238, to the negative input 244 of the second opamp 236. The positive differential output 230 of the first opamp 222 is coupled, via a respective variable resistance 240, to the positive input 242 of the second opamp 236.

The second opamp 236 comprises differential outputs, IF+ and IF−. The negative output 246 of the second opamp 236 is coupled, via a parallel arrangement of a feedback resistor 248 and a feedback capacitor 250, to the positive input 242 of the second opamp 236. The positive output 252 is coupled, via a parallel arrangement of a feedback resistor 254 and a feedback capacitor 256, to the negative input 244 of the second opamp 236.

It can also be appreciated that the negative output 246 of the second opamp 236 is coupled, via a feedback resistance 258 to the positive input 224 of the first opamp 222. Similarly, the positive output 252 of the second opamp 236 is coupled to the negative input 226 of the first opamp 222 via a corresponding feedback resistance 260. The coupling resistances 238 and 240 are variable in preferred embodiments. Similarly, the feedback resistances 258 and 260 are also variable in preferred embodiments.

In preferred embodiments, the variable resistances are realised as several discrete values by switching in or out resistors using transistor switches.

The interface circuit 202 is coupled to the active filter 204 via a coupling arrangement 220. The coupling arrangement 220 comprises a first signal path from the drain of the first MOSFET 206 to the negative input 226 of the first opamp 222. The first signal path comprises the series arrangement of a capacitor 262 and an input resistor 264. A selectively actuable switch, S5, can bypass the input resistor 264. The coupling arrangement 220 also comprises a second signal path from the drain of the second MOSFET 208 to the positive input 224 of the first opamp 222. The second signal path comprises the series arrangement of a capacitor 266 and an input resistor 268. The input resistor 268 can be bypassed by a selectively actuable switch, S4.

Opening or closing the switches S1 to S5 controls the mode of operation of the radio receiver 200. In the illustrated embodiment it can be appreciated that switches S1 to S3 are shown in the open state. Opening the switches S1 to S3 has the effect of removing the influence of the load resistors 216 and 218. It will be appreciated that closing S2 switches off the transistors 206 and 208 converting the interface, that is, operating the convertor in voltage mode whereas with S2 open the converter operates in current mode. It can also be appreciated that the switches S4 and S5 are shown in the closed state. Closing the switches S4 and S5 has the effect of bypassing the variable input resistances 264 and 268. Therefore, it can be appreciated that the radio receiver 200 is operating in current mode.

When operating in current mode, the gain of the active polyphase filter 204 is governed, primarily, by the value of the feedback resistances 258 and 260. Since it is desirable in current mode for the gain to be as large as possible because the radio receiver is operating in a small signal environment, the gain of the active polyphase filter 204 should be arranged to be relatively large. It will be appreciated that the gain is proportional to the transconductance of the mixer 202 multiplied by the value of one of the feedback resistances 258 or 260. In preferred embodiments, the gain is arranged to be of the order of 44 dB.

In preferred embodiments, the resistors 258 and 260 are of the order of tens of kΩ. In preferred embodiments, the capacitors of the order of tens of pF and below since larger capacitors require relatively large chip areas to implement.

Figure 3:
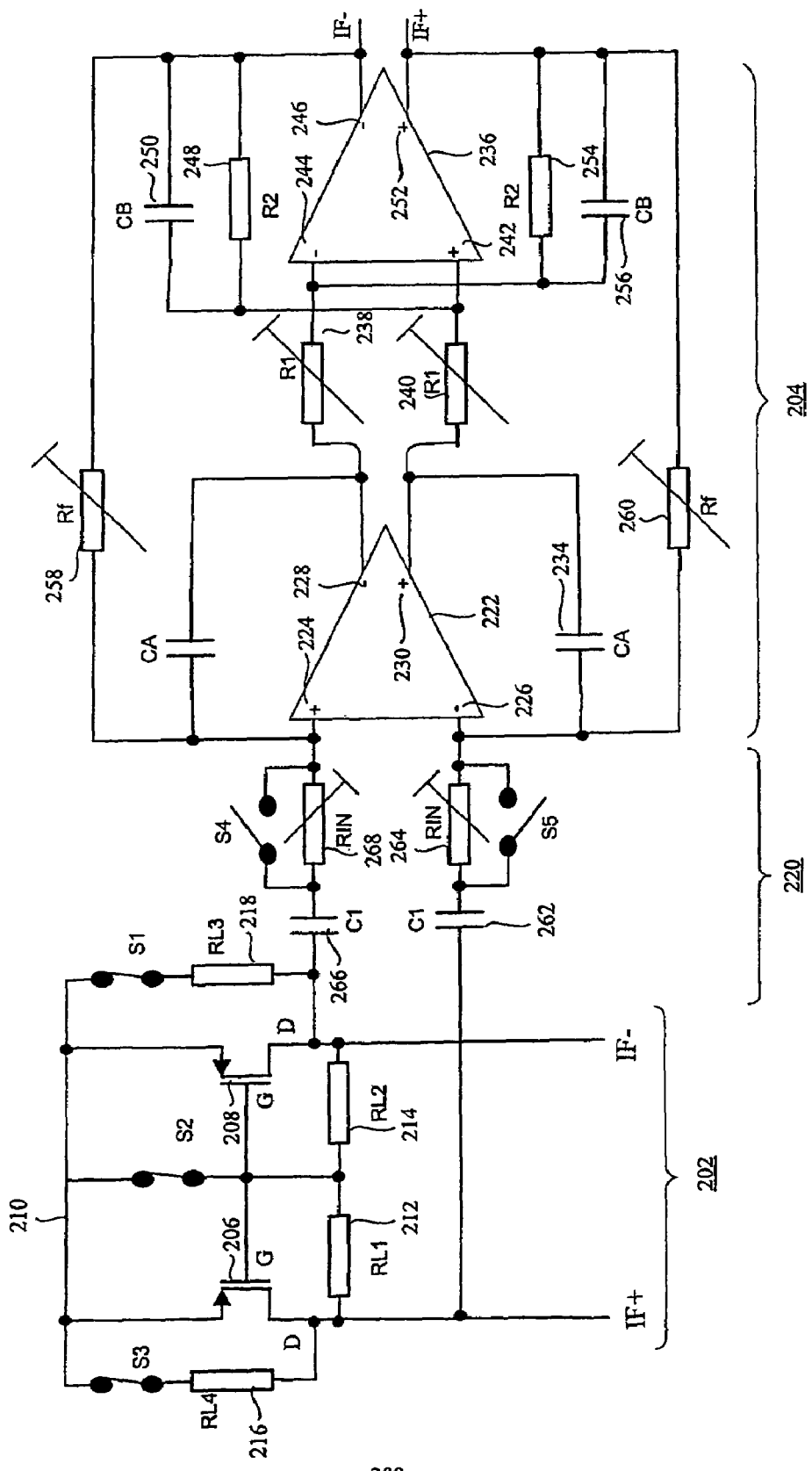
FIG. 3 depicts the part of the radio receiver, operable in voltage mode, according to the first embodiment.

Referring to FIG. 3, there is shown the part of the radio receiver 200 operating in voltage mode. Like a reference numerals refer to like features and, therefore, those features will not be described again in detail. It will be appreciated that a significant difference between the radio receiver configured to operate in current mode and the radio receiver configured to operate in voltage mode resides in the state of the switches S1 to S5. The switches associated with the interface 202, that is, switches S1 to S3, are closed. This brings into effect the load resistors 216 and 218. Closing S2 turns off the transistors 206 and 208, which creates a load comprising resistor 214 in parallel with resistor 218 and resistor 212 in parallel with resistor 215. In preferred embodiments, resistor 214 is significantly greater than resistor 218. Therefore, since resistor 214 is much greater than resistor 218 the load is to a close approximation governed by resistor 218. The same applies mutatis mutandis to resistors 112 and 216. It will be appreciated that bringing into effect the resistances 212, 214, 216 and 218 limits the current drawn by the radio receiver 200. The current drawn is limited because Rf can be kept large whilst still reducing the gain by a large amount.

It can also be appreciated that the resistances 264 and 268 in the path coupling the interface 202 to the active polyphase filter 204 have also been brought into effect by opening their corresponding switches S4 and S5. Opening the switches S4 and S5 has the effect of changing the gain of the active polyphase filter 204. It will be appreciated that bringing the resistances 264 and 268 into effect changes the gain of the active polyphase filter 204 to Rf/RIN while removing them makes the gain Rf. In voltage mode, the voltage gain from the mixer input to the IF− and IF+ nodes is gm.RL$_3$. Rf/RIN, where gm.RL$_3$ is the voltage gain of the mixer and Rf/RIN is the voltage gain of the filter. In current mode, the voltage gain from the mixer input to the IF− and IF+ nodes is gm.Rf.

When operating in the voltage mode, the interface 202 provides a voltage gain of approximately 10 dB. Therefore, the values of Rf and RIN can be selected to provide an overall desired gain.

It will be appreciated that the other resistances 238, 240, 248 and 254 of the active polyphase filter 204 are selected, or adjusted, that is, controlled, to have values that cause the filter to have an overall predetermined frequency response. In a preferred embodiment, in current mode the RIN resistors 268 and 264 are bypassed by their switches, the RF resistors 258 and 260 are 14.85KΩ, the R1 resistors 238 and 241 are 67KΩ and the R2 resistors 248 and 254 are 31.82KΩ.

In a preferred embodiment, in voltage mode the RIN resistors 268 and 264 are 4.9KΩ (providing a 24 dB gain) or 31.3KΩ (providing a −2 dB gain), the RF resistors 258 and 260 are 26KΩ, the R1 resistors 238 and 241 are 38.59KΩ and the R2 resistors 248, 254 are 31.82KΩ.

Table 1 below illustrates the gain variations in various stages of the receiver when operating in current or voltage mode.

TABLE 1

| Mode | Mixer and first stage of filter voltage gain (dB) | Second stage of filter voltage gain (dB) | Total voltage gain (dB) |
| --- | --- | --- | --- |
| Current | 44 | 12 | 56 |
| Current | 44 | 6 | 50 |
| Current | 44 | 0 | 44 |
| Current | 44 | −6 | 38 |
| Voltage | 24 | 12 | 36 |
| Voltage | 24 | 6 | 30 |
| Voltage | 24 | 0 | 24 |
| Voltage | 24 | −6 | 18 |
| Voltage | 8 | 12 | 20 |
| Voltage | 8 | 6 | 14 |
| Voltage | 8 | 0 | 8 |
| Voltage | 8 | −6 | 2 |

Figure 4:
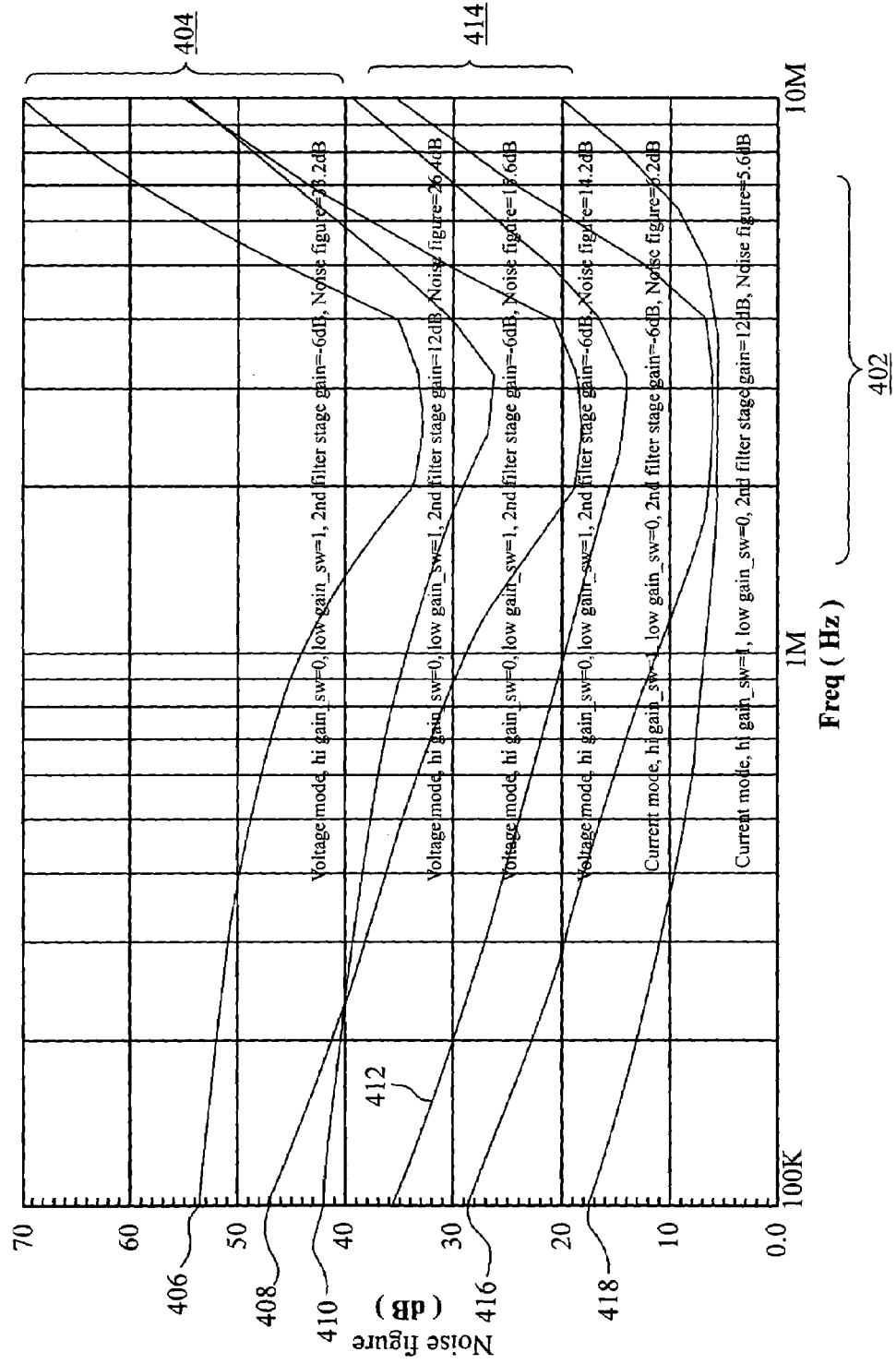
FIG. 4 illustrates graphs of noise figure against frequency for embodiments.

Referring to FIG. 4, there is a number of plots 400 showing the variation in noise figure with frequency for a number of configurations of the radio receiver, that is, for the receiver operating in voltage and current modes. It can be appreciated that there is a region 402 in which the noise figure response is a minimum, which occurs at substantially 3 MHz in preferred embodiments. However, one skilled in the art appreciates that the minimum can be made to coincide with any other predeterminable frequency according to a corresponding application of the radio receiver. Four noise figure against frequency responses are shown for the radio receiver operating in voltage mode. These responses are indicated, generally, by reference 404. The first voltage mode noise figure response 406 has a minimum noise FIG. of 33.2 dB at 3 MHz. The second noise figure response 408 of the radio receiver operating in voltage mode has a minimum noise figure of 26.4 dB. The third noise figure response 410 of the radio receiver operating in voltage mode has a minimum noise figure of 18.6 dB. The fourth noise figure response 412 of the radio receiver operating in voltage mode has a minimum noise figure of 14.2 dB. It can be appreciated that two noise figure responses are also shown for the radio receiver operating in current mode. These two current mode noise figure responses are referred to generally by the reference 414. The first current mode noise figure response 416 has a minimum noise figure of 6.2 dB. The second current mode noise figure response 418 has a minimum noise figure of 5.6 dB.

Figure 5:
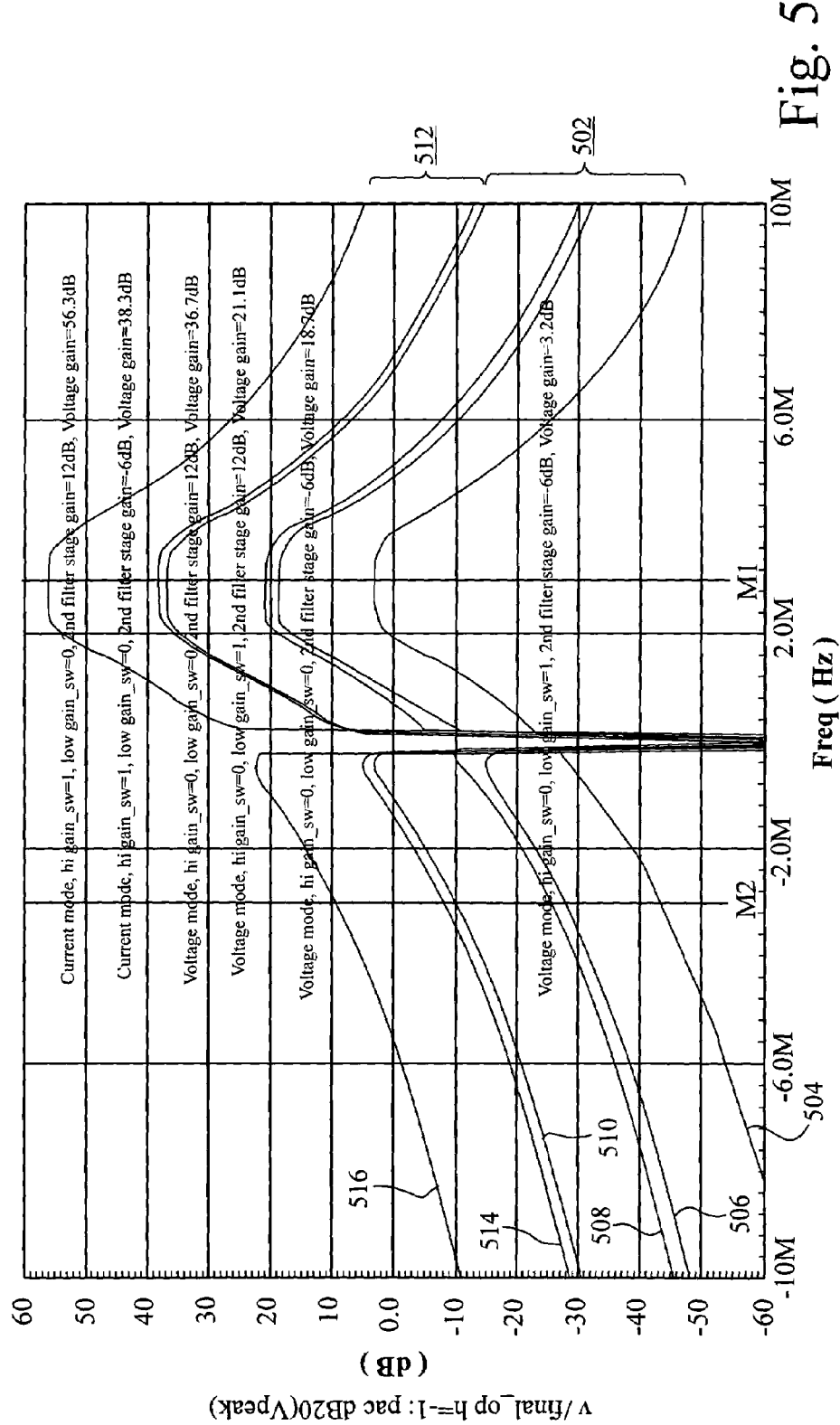
FIG. 5 depicts graphs of magnitude against frequency for embodiments.

Referring to FIG. 5 there is shown a number of frequency responses 500 of the radio receiver operating in current and voltage modes. The frequency responses 500 correspond to the above-described noise figure responses. The voltage mode frequency responses are referred to generally by the reference 502. The first voltage mode frequency response 504, which corresponds to the first voltage mode noise figure response 406, has a maximum gain of 3.2 dB centred substantially at 3 MHz. The second voltage mode frequency response 506 has a maximum gain of 18.7 dB centred at 3 MHz. The third voltage mode frequency response 508 has a maximum gain of 21.1 dB centred at substantially 3 MHz. The final voltage mode frequency response 510 has a maximum gain of 36.7 dB centred at substantially 3 MHz. It can also be appreciated that FIG. 5 illustrates a pair 512 of current mode frequency responses. The first current mode frequency response 514 has a maximum gain of 38.3 dB centred at substantially 3 MHz. The second current mode frequency response 516 has a maximum gain of 56.3 dB centred at 3 MHz.

Even though the above embodiments have been described with reference to a radio receiver, it will be appreciated that embodiments can be realised in the form of a transceiver.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings) and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The invention claimed is:

1. A radio receiver, comprising:
   a mixer;
   an active filter; and
   an interface circuit for coupling the mixer to the active filter; the interface circuit being arranged to influence the mode of operation of the radio receiver to be selectively operable in a current mode or a voltage mode;
   wherein the radio receiver has a relatively high gain in the current mode and a relatively low gain in the voltage mode, the mixer has a load impedance that is relatively high in the current mode and relatively low in the voltage mode, and the active filter has an input impedance that is relatively low in the current mode and relatively high in the voltage mode.

2. A radio receiver, comprising:
   a mixer;
   an amplifier; and
   an interface circuit for coupling the mixer to the amplifier, the interface circuit being arranged to influence the mode of operation of the radio receiver to be selectively operable in a current mode or a voltage mode;
   wherein the radio receiver has a relatively high gain in the current mode and a relatively low gain in the voltage mode, the mixer has a load impedance that is relatively high in the current mode and relatively low in the voltage mode, and the amplifier has an input impedance that is relatively low in the current mode and relatively high in the voltage mode.

3. A radio receiver as claimed in claim 1, further comprising:
   means for varying the gain of the active filter according to whether the radio receiver is operable in current mode or voltage mode.

4. A radio receiver as claimed in claim 1, wherein the active filter is an active polyphase filter.

5. A radio receiver as claimed in claim 4, wherein a first stage of the active polyphase filter comprises a pair of fully differential operational amplifiers.

6. A radio receiver as claimed in claim 1, wherein the active filter comprises a feedback resistance (Rf).

7. A radio receiver as claimed in claim 6, wherein the feedback resistance is variable.

8. A radio receiver as claimed in claim 1, wherein the interface circuit comprises means to limit current consumption during a voltage mode of operation.

9. A radio receiver as claimed in claim 8, wherein the means to limit to current consumption comprises means to selectively enable and disable a plurality of resistances to vary the influence of those resistances on the operation of the active filter.

10. A radio receiver as claimed in claim 1, wherein the interface circuit comprises a pair of input resistors coupled to the active filter that can be selectively enabled or disabled.

11. A radio receiver as claimed in claim 1, further comprising:
means to vary a gain of the active filter according to a mode of operation of the radio receiver.

12. A radio receiver as claimed in claim 11, wherein the means to vary the gain of the active filter according to the mode of operation of the radio receiver is configured to increase the gain in current mode and reduce the gain in voltage mode.

13. A radio receiver as claimed in claim 1, wherein the active filter comprises a plurality of variable resistances configured to influence the overall frequency response of the active filter.

14. A method of operating a radio receiver, comprising:
selectively operating the radio receiver in a current mode or a voltage mode according to conditions prevailing within a wireless environment, the radio receiver having a relatively high gain in the current mode and a relatively low gain in the voltage mode, the radio receiver comprising a mixer and at least one of an active filter and an amplifier, the mixer having a load impedance that is relatively high in the current mode and relatively low in the voltage mode, and the at least one of the active filter and the amplifier having an input impedance that is relatively low in the current mode and relatively high in the voltage mode.

15. A transceiver, comprising:
a receiver, comprising:
  a mixer;
  an active filter;
  and an interface circuit for coupling the mixer to the active filter; the interface circuit being arranged to influence the mode of operation of the radio receiver to be selectively operable in a current mode or a voltage mode, the receiver having a relatively high gain in the current mode and a relatively low gain in the voltage mode, the mixer having a load impedance that is relatively high in the current mode and relatively low in the voltage mode, and the active filter having an input impedance that is relatively low in the current mode and relatively high in the voltage mode.

16. A transceiver, comprising:
a receiver, comprising:
  a mixer;
  an amplifier; and
  an interface circuit for coupling the mixer to the amplifier, the interface circuit being arranged to influence the mode of operation of the radio receiver to be selectively operable in a current mode or a voltage mode, the receiver having a relatively high gain in the current mode and a relatively low gain in the voltage mode, the mixer having a load impedance that is relatively high in the current mode and relatively low in the voltage mode, and the amplifier having an input impedance that is relatively low in the current mode and relatively high in the voltage mode.

* * * * *